(12) United States Patent
Baik et al.

(10) Patent No.: US 8,374,624 B2
(45) Date of Patent: Feb. 12, 2013

(54) LOCATION MEASUREMENT METHOD BASED ON PREDICTIVE FILTER

(75) Inventors: Jin-Serk Baik, Ansan-si (KR); Joon-Oo Kim, Suwon-si (KR); Yun-Je Oh, Suwon-si (KR); Joong-Soo Ma, Daejeon Metropolitan (KR); Myoung-Hwan Seo, Daejeon Metropolitan (KR); Myoung-In Ji, Daejeon Metropolitan (KR); Sung-Chang Choi, Daejeon Metropolitan (KR)

(73) Assignees: Samsung Electronics Co., Ltd (KR); Information and Communication University (KR)

( * ) Notice: Subject to any disclaimer, the term of this patent is extended or adjusted under 35 U.S.C. 154(b) by 797 days.

(21) Appl. No.: 12/397,799

(22) Filed: Mar. 4, 2009

(65) Prior Publication Data
US 2009/0227266 A1    Sep. 10, 2009

(30) Foreign Application Priority Data

Mar. 4, 2008    (KR) .................. 10-2008-0019931

(51) Int. Cl.
*H04W 4/02* (2009.01)
(52) U.S. Cl. ........... 455/456.1; 342/357.32; 342/357.68; 342/464; 342/357.63; 342/450; 701/201; 701/207; 701/480; 701/209; 701/208; 702/158
(58) Field of Classification Search .............. 455/456.1
See application file for complete search history.

(56) References Cited

U.S. PATENT DOCUMENTS

| 4,254,744 | A  | * | 3/1981 | Mizote | 123/480 |
|---|---|---|---|---|---|
| 6,385,454 | B1 |  | 5/2002 | Bahl et al. | |
| 2005/0192745 | A1 | * | 9/2005 | Abraham et al. | 701/213 |
| 2006/0028377 | A1 | * | 2/2006 | Abraham | 342/357.12 |
| 2007/0247366 | A1 | * | 10/2007 | Smith et al. | 342/464 |
| 2008/0004796 | A1 | * | 1/2008 | Schott et al. | 701/201 |
| 2010/0123623 | A1 | * | 5/2010 | Abraham | 342/357.12 |

FOREIGN PATENT DOCUMENTS

| KR | 1020050117557 | 12/2005 |
|---|---|---|
| WO | WO 2004/084022 | 9/2004 |

OTHER PUBLICATIONS

Congwei Hu et al.: Adaptive Kalman Filtering for Vehicle Navigation, Journal of Global Positioning Systems, vol. 2, No. 1, Jan. 1, 2003.
Nicom Promkajin et al.: An Improvement to the Adaptive Kalman Filter with the Feedback of Estimation Error, Student Conference on Research & Development, Aug. 25, 2003.

* cited by examiner

*Primary Examiner* — Jinsong Hu
*Assistant Examiner* — Jean Chang
(74) *Attorney, Agent, or Firm* — The Farrell Law Firm, P.C.

(57) ABSTRACT

Provided is a location measurement method of a mobile node using a predictive filter is provided for improving the location measurement accuracy of the mobile node. The location measurement method of a mobile node detects change of movement pattern of the mobile node, corrects weights of a location measurement period and a predictive filter depending on the change of movement pattern, and compensates a location of the mobile node using the corrected weights of the location measurement period and predictive filter.

13 Claims, 7 Drawing Sheets

LOCATION MEASUREMENT METHOD BASED ON PREDICTIVE FILTER

PRIORITY

This application claims priority to an application entitled "LOCATION MEASUREMENT METHOD BASED ON PREDICTIVE FILTER" filed in the Korean Intellectual Property Office on Mar. 4, 2008 and assigned Serial No. 10-2008-0019931, the contents of which are incorporated herein by reference.

BACKGROUND OF THE INVENTION

1. Field of the Invention

The present invention relates generally to a location measurement method and, in particular, to a location measurement method of a mobile node using a predictive filter that is capable of improving the location measurement accuracy of the mobile node.

2. Description of the Related Art

In a method for calculating location measurement error of a mobile node, a predictive filter is used to predict its location using the past measurement information and environmental information.

In order to compensate location measurement error of a mobile node, a predictive filter based compensation method using past measurements and environmental information, or a finger printing method using previously recorded site-specific signal patterns are used.

The predictive filter allows estimation of a current location of the mobile node using the past location and state information and compensates for the offset between the measured and predicted locations by adopting weights depending on the reliability of the information. A Kalman filter is one of the well known predictive filters. The Kalman filter adjusts a weight applied to a estimated value of a covariance matrix and an actually measured value.

The Kalman filter-based location prediction method is briefly explained as follows. First, a mobile node acquires coordinates of at least three anchor nodes and measures periodically the distances from the anchor nodes and then determines coordinates that have the smallest errors from each anchor node through a least square method as the location of the mobile node. The acquired coordinates are input to the Kalman filter so as to be output as a compensated coordinates. This method is described in more detail as follows, with reference to FIGS. 1, 2A, and 2B.

FIG. 1 is a graph illustrating a simulated result of measurement error compensation using a conventional least square method and Kalman filter, and FIGS. 2a and 2b are conceptual diagrams illustrating exemples of movements of a mobile node in indoor environments.

In FIG. 1, the axes x and y denote distances in units of meters (m). The measurement period ($\Delta t$) is set to 2 seconds, and the mobile node moves at a speed of 0.6 m/s.

The solid line 110 denotes the movement line of the mobile node, and mark x 130 denotes a location value estimated by using the least square method, the bold solid line 150 denotes a movement line of the mobile node compensated for the location measurement errors using the Kalman filter.

Here, it is assumed that the weight of the Kalman filter, i.e. process covariance matrix, and the measurement covariance matrix are constant.

RMSE (LeastSquare) is a Root Mean Squared Error (RMSE) obtained by applying the least square method. That is, the RMSE indicates the amount of mean error between the coordinates calculated by the least square method and the measured coordinates. RMSE (KalmanFilter) is the RMSE obtained by applying the Kalman filter. That is, the RMSE (KalmanFilter) indicates the size of a mean error between the coordinates obtained by applying the least square method and then the Kalman filter and the measured coordinates.

As shown in FIG. 1, when a constant covariance is used and the movement direction of the mobile node changes abruptly, the route obtained by applying the Kalman filter deviates from the actual movement route. This effect can occur when a movement direction of a mobile node previously moving straight along a corridor changes its movement direction at a corner of the corridor (see FIG. 2a), or when the mobile node enters a room positioned at one side of the corridor (see FIG. 2b).

In order to solve this problem, research has been focused on searching for ways to determine the weight of the predictive filter, adaptive to the situation of the mobile node. As a result, the most of the conventional techniques have been developed with a supplementary device such as an acceleration sensor and/or an initia sensor for acquiring information required for adjusting the weight of the predictive filter.

However, the conventional techniques are disadvantageous since additional physical elements, such as the acceleration sensor and initia sensor, increase the manufacturing cost and size of the mobile node. Furthermore, processing the information acquired by the additional elements increases the system complexity.

SUMMARY OF THE INVENTION

In order to solve the above problems of the prior art, the present invention provides a location measurement method that is capable of improving location measurement accuracy using a predictive filter.

The present invention further provides a location measurement method that is capable of adjusting a parameter of a Kalman filter adaptively for improving location measurement accuracy especially in indoor environment.

The present invention further provides a location measurement method that is capable of improving the location measurement accuracy of a mobile node by adaptively using a Kalman filter.

The present invention further provides a location measurement method for a mobile node that is capable of changing a location measurement period ($\Delta t$) and weight of a predictive filter adaptive to the movement of the mobile node.

Furthermore, the present invention provides a location measurement method for a mobile node that is capable of improving location measurement accuracy by predicting a change of the mobile node's movement and correcting the weight of a predictive filter used in a measurement period and error compensation process adaptively.

In accordance with an embodiment of the present invention, a location measurement method of a mobile node includes detecting change of a movement pattern of the mobile node, correcting weights of a location measurement period and a predictive filter according to the change of movement pattern, and calculating a location of the mobile node using the corrected weights of the location measurement period and predictive filter.

In accordance with another embodiment of the present invention, a location measurement method of a mobile node includes estimating, when detecting a change of a movement pattern of the mobile node, a location of the mobile node using a least square method, comparing a distance and an azimuth of the movement pattern with respective threshold values, correcting, when the distance of the movement pattern is greater than the threshold values, a weight of a location measurement period, correcting, when the azimuth of the movement pattern is greater than the threshold values, a weight of a predictive filter, and calculating a location measurement of the mobile node by applying the corrected weights.

BRIEF DESCRIPTION OF THE DRAWINGS

The above and other objects, features and advantages of the present invention will be more apparent from the following detailed description in conjunction with the accompanying drawings, in which:

FIG. 4 is a flowchart illustrating a location measurement method according to an embodiment of the present invention;

FIG. 5 is a flowchart illustrating a location measurement method according to another embodiment of the present invention;

DETAILED DESCRIPTION OF EMBODIMENTS

Figure 1:
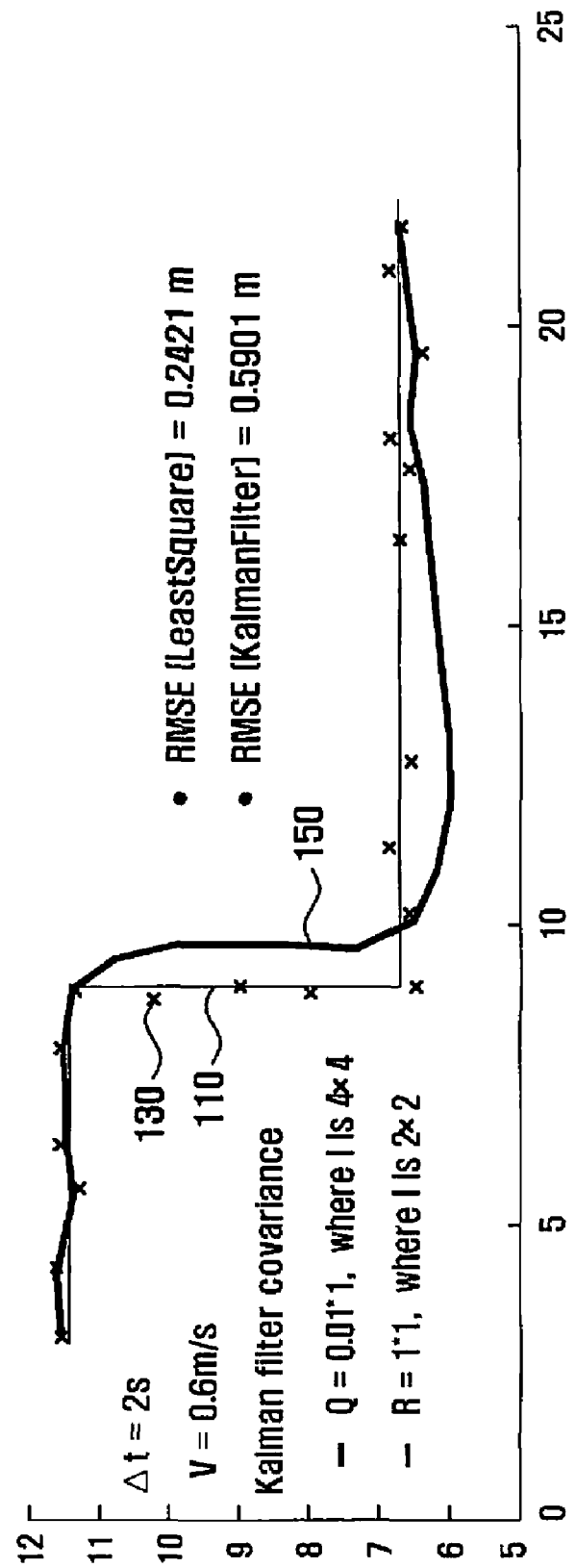
FIG. 1 is a graph illustrating a simulation result of location measurement error compensation using a conventional least square method and Kalman filter.
Figure 2A:
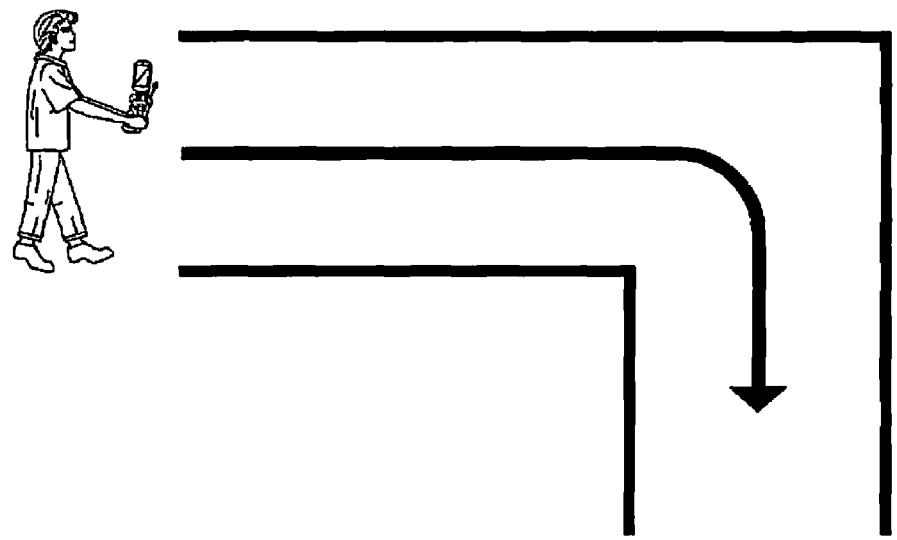
FIGS. 2a and 2b are conceptual diagrams illustrating movements of a mobile node in indoor environments.
Figure 2B:
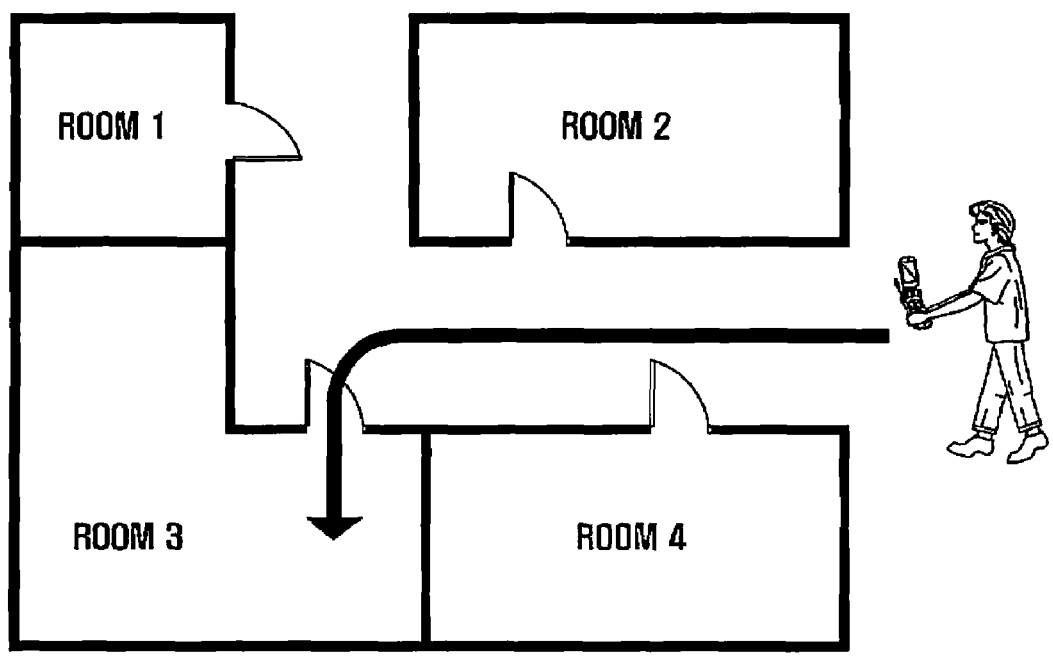

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The words and terms used in the specification and claims are for illustrative purposes only rather than limitation. Examples and constitutions as described herein do not cover all the technical spirit of the present invention but are merely the most preferred embodiments of the present invention. Thus, it should be understood that various equivalents and modifications can be made to the embodiments of the present invention.

In the following descriptions, a predictive filter-based location measurement method for improving the location measurement accuracy of a mobile node is provided. In the following embodiments, the mobile node adjusts the parameter value of a predictive filer adaptively for enhancing the location measurement accuracy especially in an indoor environment. That is, the mobile node corrects the measurement period ($\Delta t$) and weight of the predictive filter adaptive to the movement of the mobile node.

For this purpose, the mobile node according to an embodiment recognizes a change of a movement pattern and corrects the measurement period ($\Delta t$) and weight of the predictive filter adaptive to the change of movement pattern for compensating the location measurement of the mobile node.

In the location measurement method according to an embodiment of the present invention, the mobile node converts displacement information to cylindrical coordinates every measurement period in order to recognize the change of movement.

In the location measurement method according to an embodiment of the present invention, the location measurement period ($\Delta t$) is adjusted in order to compensate the error caused by the change of the mobile node's movement.

In the location measurement method according to an embodiment of the present invention, the location measurement period ($\Delta t$) is adjusted inversely proportional to the movement speed of the mobile node.

In the location measurement method according to an embodiment of the present invention, the weight of the predictive filter is adjusted according to the change of movement of the mobile node.

In the location measurement method according to an embodiment of the present invention, the mobile node calculates the changes of its movement direction and speed and, when the calculated values are greater than threshold values, the mobile node adjusts weights to be applied between the estimated value of the predictive filter and measured value.

In the location measurement method according to an embodiment of the present invention, the mobile node increases the weight to be applied to the measured value when the changes of movement direction and speed are greater than the threshold values, such that the measured value is first compensated in a measured location compensation process.

Although a Kalman filter is adopted in the location measurement method according to an embodiment of the present invention as the predictive filter, the present invention is not limited thereto. For example, the location measurement method of the present invention can be implemented with various predictive filters for calculating the location measurement error.

The Kalman filter is called an optimal recursive data processing algorithm. The Kalman filter tracks an optimal value through a recursive data processing and is a recursive computational solution effective for tracking a time-dependent state vector according to the time having equations of motion to a noise in real time using the least square method. Here, the least square method is a method for obtaining an estimated amount that minimizes the sum of square of an error, i.e., the least square estimator.

Usage of the Kalman filter is described as follows.

First, it is assumed that x(n) and y(n) satisfy a set of Equations (1):

$x(n+1) = F(n+1,n)x(n) + v_1(n)$, ($M \times 1$ matrix)

$y = C(n)x(n) + v_2(n)$, ($M \times 1$ matrix)

$v_1(n) \sim N(0, Q_1(n))$, ($M \times 1$ matrix)

$v_2(n) \sim N(0, Q_2(n))$, ($M \times 1$ matrix)  (1)

In Equations (1), ignoring noise, the variables are expected vary over time due to their linear relationships. Also, ignoring the expected noise between the variables and the observed values, linear relationships are therebetween.

In Equations (1), x(n) is an $M \times 1$ matrix containing a variable expected to be known at specific time n. As shown in the first equation, ignoring the noise $v_1(n)$, x(n) varies to x(n+1) linearly by the matrix F(n+1,n). F(n+1,n) defining the relationship between x(n) and x(n+1) is an $M \times M$ matrix called transition matrix. $v_1(n)$ is noise or observation error and follows a normal distribution with a mean of 0 (M×1 zero matrix) and a covariance matrix $Q_1(n)$ (M×M matrix) as shown in the third equation. y(n) is an N×1 matrix containing the values observed for knowing the x(n).

As shown in the second equation, ignoring the noise $v_2(n)$, y(n) has a linear relationship with x(n) by the matrix C(n). C(n) defines the relationship between y(n) and x(n) is an N×M matrix called a measurement matrix. $v_2(n)$ can be regarded as noise or an observation error and follows a normal distribution with a mean of 0 (N×1 zero matrix) and a covariance matrix $Q_2(n)$ (N×N matrix).

With the above system model, the Kalman filter is used to estimate x(n) as follows:

1) Initialization
   x(1|Y(0))=>x(1) expected as optimal value (M×1 matrix)
   K(1,0)=>constant value for optimal performance (M×M matrix)
   $F(n,n+1)=F(n+1,n)^{-1}$=>pre-calculate if a model is determined (M×M matrix)
2) Execute actually (n=1,2, . . . )

$$G(n)=F(n+1,n)K(n,n-1)C^H(n)[C(n)K(n,n-1)C^H(n)+Q_2(n)]^{-1}, (M \times N \text{ matrix})$$

$$\alpha(n)=y(n)-C(n)\times(n|Y(n-1)), (M \times 1 \text{ matrix})$$

$$x(n+1|Y(n))=F(n+1,n)\times(n|Y(n-1))+G(n)\alpha(n), (M \times 1 \text{ matrix})$$

$$K(n)=K(n,n-1)-F(n,n+1)G(n)C(n)K(n,n-1), (M \times M \text{ matrix})$$

$$K(n+1,n)=F(n+1,n)K(n)F^H(n+1,n)+Q_1(n), (M \times M \text{ matrix}) \quad (2)$$

where Y(n) is a set of observed values {y(1),y(2), . . . ,y(n)}, x(n|Y(n−1) is x(n) estimated based on the observation results to Y(n−1), F(n,n+1) is an expanded concept of F(n+1,n), i.e., an inverse matrix of F(n+1,n) for obtaining x(n) from x(n+1) when ignoring noise, and other parameters are variables used in the intermediate calculation process. The superscript H denotes a conjugate transpose of a matrix, and superscript −1 denotes an inverse matrix of a matrix.

The parameters used in the embodiments of the present invention are defined hereinafter.

According to embodiments of the present invention, the location measurement period (Δt) is an interval for measuring the location of a mobile node. The mobile node measures the distances from at least three anchor nodes and calculates its location based on the distances every measurement period (Δt).

Also, a location change measurement period (Δs) is used for measuring a movement change of the mobile node according to embodiments of the present invention. The mobile node compares the coordinates of a past change measurement period with the coordinates of the current change measurement period, i.e., the location change measurement period (Δs) is a parameter for determining a duration for comparing the past coordinates and current coordinates and is a constant multiple of the location measurement period (Δt).

The location change measurement period (Δs) is set to a constant multiple of the location measurement period (Δt) in order to secure at least one set of coordinates from previous measurements.

The location change measurement period (Δs) is variable. In order to detect the movement of the mobile node more precisely, it is preferable to set the location change measurement period (Δs) to a large value. Otherwise, in order to detect the movement of the mobile node more quickly, it is preferable to set the location change measurement period (Δs) to a small value. When the location change measurement period (Δs) is too short, it is difficult to determine whether the angular change is caused by the actual movement or an error. Accordingly, the location change measurement period (Δs) should be set to a value obtained for an optimized system performance.

The location measurement method according to an embodiment of the present invention is described in more detail with reference to drawings.

Figure 3:
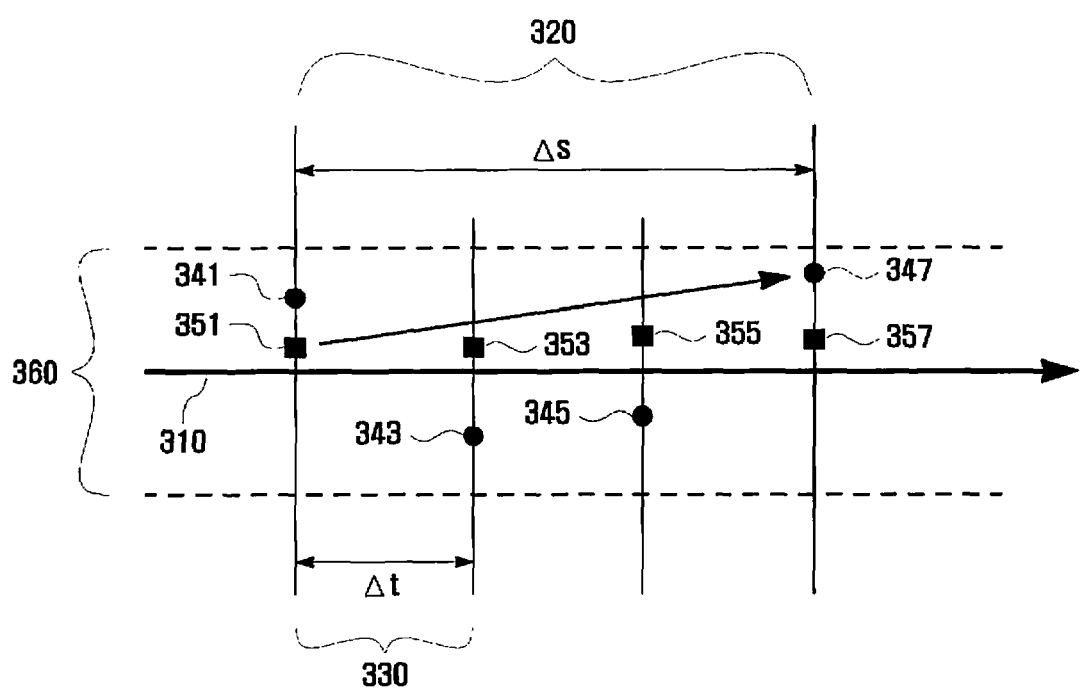
FIG. 3 is a diagram illustrating concepts of a location measurement period ($\Delta t$) and a location change measurement period ($\Delta s$) for use in a location measurement method according to an embodiment of the present invention.

FIG. 3 is a diagram illustrating concepts of a location measurement period (Δt) and a location change measurement period (Δs) for use in a location measurement method according to an embodiment of the present invention. In FIG. 3, it is shown that a maximum error angle of the mobile node having a predetermined error range is determined according to the location change measurement period (Δs).

Reference number 310 denotes an actual movement route of the mobile node, 320 denotes a location change measurement period (Δs), and 330 denotes a location measurement period (Δt). Reference numbers 341, 343, 345, and 347 denote measured locations of the mobile node as the mobile node moves along the route 310, and reference numbers 351, 353, 355, and 357 denotes compensated locations of the mobile node to the measured locations 341, 343, 345, and 347. Reference number 360 denotes an error range.

Adjustment of the measurement periods and the weight of the predictive filter for calculating the measured locations is described as follows.

The mobile node acquires ranging results from at least three anchor nodes every location measurement period (Δt) and calculates the location recognition coordinates ($\tilde{x},\tilde{y}$) of the mobile node using the least square estimation. The location recognition coordinates ($\tilde{x},\tilde{y}$) are measured location coordinates.

The reason the ranging results are acquired from at least three anchor nodes is to calculate the position of the mobile node using a triangulation method. The triangulation method calculates the distances between the mobile node and the anchor nodes using the time-of-arrivals of signals from the anchor nodes. The location is determined at a point at which the circles drawn with the distances from the at least three anchor nodes as their radii are crossing. For this purpose, the mobile node receives the ranging results from at least three anchor nodes.

Next, the mobile node compares the location recognition coordinates ($\tilde{x},\tilde{y}$) acquired from the least square estimations with past coordinates compensated before the location change measurement period (Δs) and converts the displacements to the coordinates of a cylindrical coordinate system $(\sigma,\phi,z)$.

The cylindrical coordinate system is a three-dimensional polar coordinate system in which a point P is represented by a triple $(\sigma,\phi,z)$ including a height z (or h) from a plane in addition to a plane polar coordinate system. The cylindrical coordinate system is useful in analyzing surfaces that are symmetrical about an axis. In the case of the cylindrical coordinate system, a point can be represented by multiple coordinates. Accordingly, as a generalization, the ranges of parameters are restricted as follows.

$$\sigma \geq 0,$$

$$0 \leq \phi \leq 2\pi, \text{ and} \quad (3)$$

z:no restriction.

In the ranges of the parameters, the coordinates of the rectangular coordinate system is converted to the coordinates of the cylindrical coordinate system as follows:

$$\sigma = \sqrt{x^2 + y^2}, \quad (4)$$
$$\phi = \arctan\frac{y}{x},$$
and
$$z = z.$$

The coordinate conversion Equations (4) can be expressed by Equations (5) to be applied to the location measurement method according to an embodiment of the present invention. The location recognition coordinates $(\tilde{x},\tilde{y})$ acquired from the least square estimations can be converted to the cylindrical coordinates as follows:

$$\sigma_t = \sqrt{(\overline{x}_t - x_{t-\Delta s})^2 - (\overline{y}_t - y_{t-\Delta s})^2} \quad (5)$$
and
$$\phi_t = \arctan\left\{\frac{(\overline{y}_t - y_{t-\Delta s})}{(\overline{x}_t - x_{t-\Delta s})}\right\}.$$

The location recognition coordinates $(\tilde{x},\tilde{y})$ measured at time t are compared with a past location measurement calculated before the location change measurement period ($\Delta s$) to be converted to cylindrical coordinates according to the Equations (5). In a cylindrical coordinate system, $\sigma_t$ is a mobile node's movement distance, and $\phi_t$ is a mobile node's movement azimuth (angle).

Next, the mobile node compares the distance $\sigma_t$ and azimuth $\phi_t$ of the movement during the location change measurement period ($\Delta s$) with respective threshold values.

The threshold values are preferably set larger than error range of the location measurement. Accordingly, in a case that the location measurement error range is narrow, the thresholds are set to much smaller values, thereby detecting the movement pattern of the mobile node mover sensitively.

As a result of the comparison between the measurements with the threshold values, if the measured distance is greater than the threshold distance, the mobile node decreases the location measurement period ($\Delta t$). Also, if the measured azimuth is greater than the threshold azimuth, the mobile node weights the location recognition coordinates $(\tilde{x},\tilde{y})$ rather than the estimated coordinates in calculating the location measurement by adjusting the weight of the predictive filter.

Otherwise, if the measured distance and azimuth of the mobile node's movement are less than the threshold values, the mobile node compensates the measurements using the predictive filter in conventional manner.

The location measurement method based on the above-described system is described hereinafter. The present invention is not limited to the following description, but can be practiced with various equivalents and modifications in other embodiments.

Figure 4:
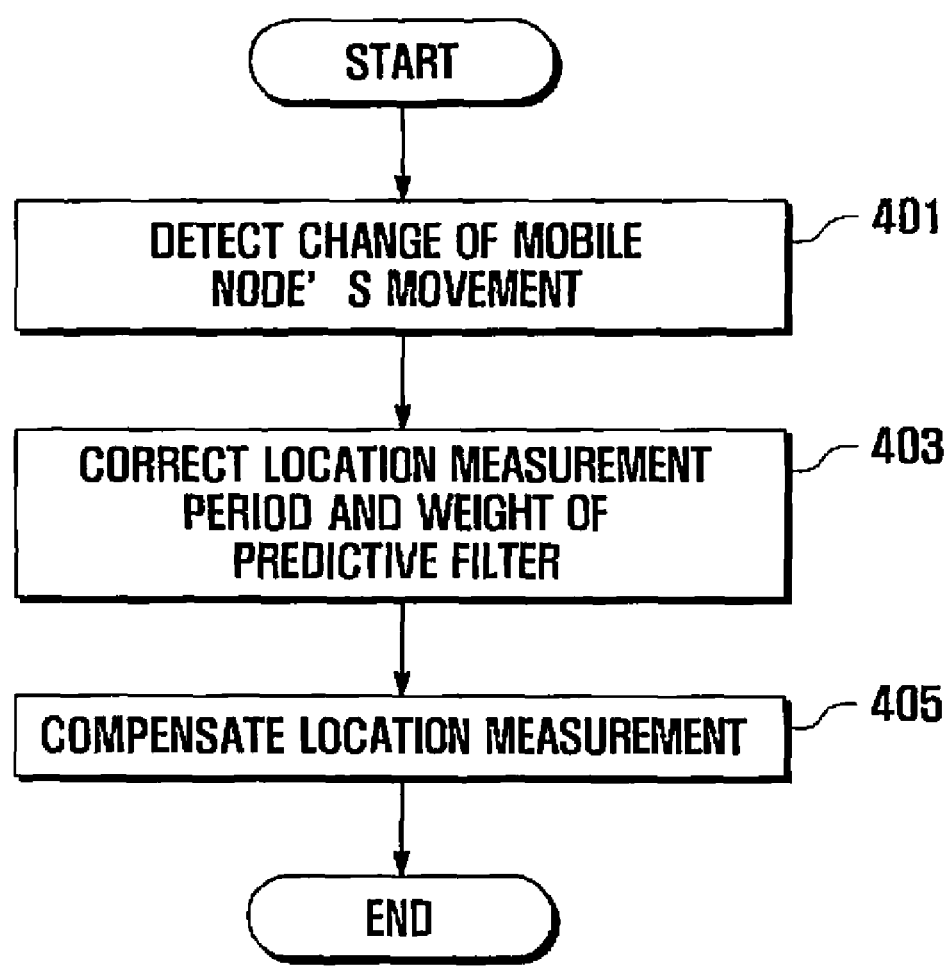
FIGS. 4 and 5 are flowchart illustrating a location measurement and measurement compensation method according to an embodiment of the present invention
Figure 5:
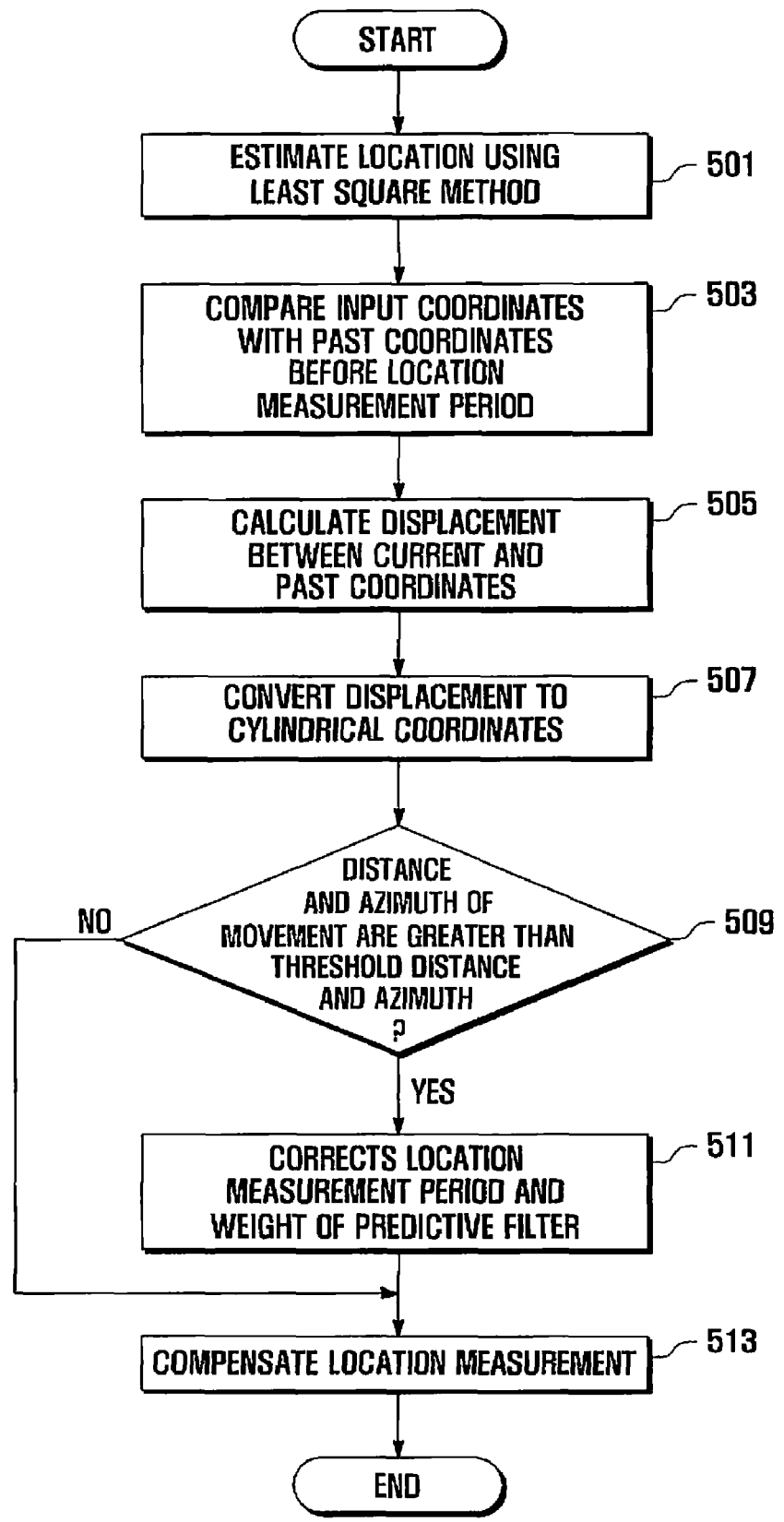

FIGS. 4 and 5 are flowcharts illustrating a location measurement and a measurement compensation method according to an embodiment of the present invention.

Referring to FIG. 4, the location measurement method according to an embodiment of the present invention includes detecting a change of a mobile node's movement pattern, in step 401, correcting a location measurement period ($\Delta t$) and a weight of a predictive filter depending on the degree of the change of the mobile node's movement pattern, in step 403, and calculating the location of the mobile node based on the corrected location measurement period ($\Delta t$) and weight of the predictive filter, in step 405.

The location measurement period ($\Delta t$) is a duration for measuring the location of the mobile node. The steps of FIG. 4 are described in more detail with reference to FIG. 5.

Referring to FIGS. 4 and 5, if the change of movement pattern is detected, the mobile node estimates its location using the least square method, in step 501.

In order to recognize the change of the movement pattern, the mobile node can convert the displacement information to cylindrical coordinates at every location change measurement period ($\Delta s$), which is variable. The current location of the mobile node, i.e., the location recognition coordinates $(\tilde{x},\tilde{y})$, is estimated by applying the least square method to the ranging results received from at least three anchor nodes. Here, the location recognition coordinates $(\tilde{x},\tilde{y})$ are the measured coordinates of the mobile node.

Next, the mobile node compares the location recognition coordinate $(\tilde{x},\tilde{y})$ with the past measured coordinates of the mobile node by location change measurement period ($\Delta s$), in step 503, and calculates a displacement between the current and past coordinates, in step 505. Next, the mobile node converts the displacement to cylindrical coordinates, in step 507. The cylindrical coordinate system is a three-dimensional polar coordinate system including a height z (or h) from a plane in addition to a plane polar coordinate system. The coordinate conversion can be performed using Equations (3) to (5).

Next, the mobile node compares the distance and azimuth of its movement and threshold distance and azimuth values by location change measurement period ($\Delta s$), respectively, in step 509.

As a result of the comparison, if both the distance and azimuth of the mobile node's movement are greater than the threshold distance and azimuth values, then the mobile node decreases the location measurement period ($\Delta t$) and corrects the weight of the predictive filter, in step 511, and compensates the location of the mobile node based on the updated location measurement period ($\Delta t$) and predictive filter's weight, in step 513. Otherwise, if at least one of the distance and azimuth of the mobile node's movement is less than or equal to than the threshold distance value or azimuth value, the mobile node compensates the object(s) (distance and/or azimuth), which is (are) not greater than the corresponding threshold(s), in normal compensation manner, and compensates the object (distance or azimuth), which is greater than the corresponding threshold, by correcting its weight, in step 513.

Figure 6:
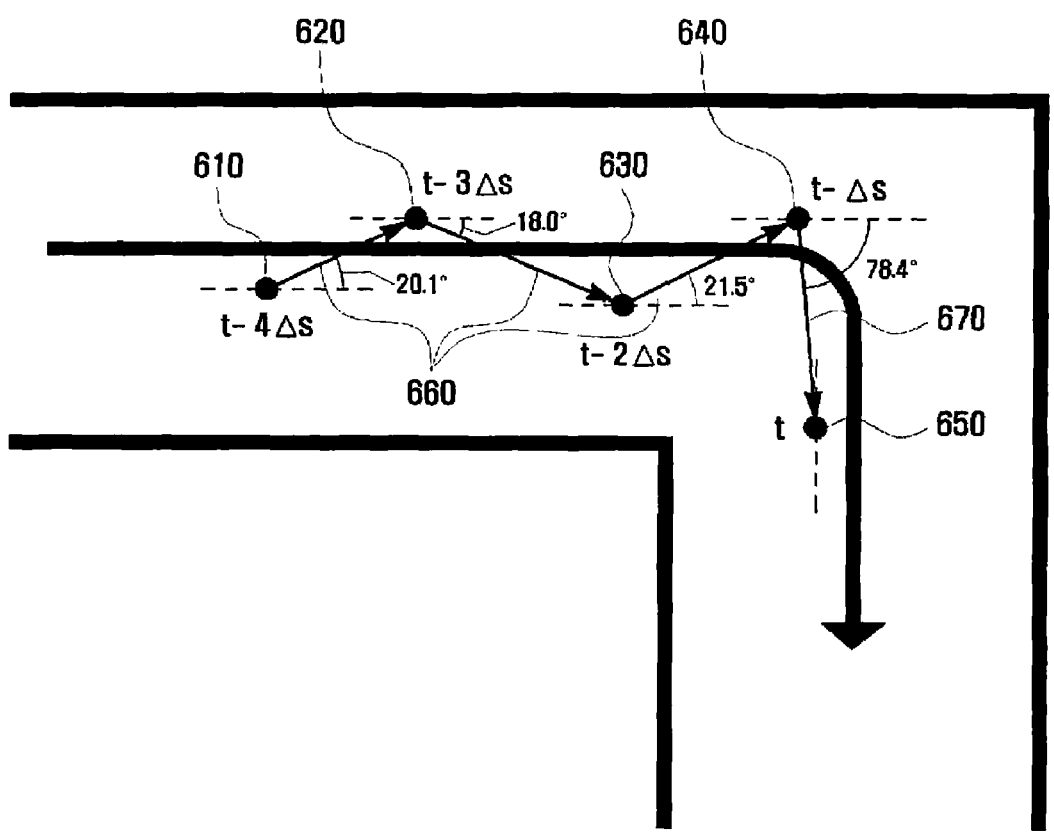
FIG. 6 is a diagram illustrating a calculation of a location measurement in a location measurement method according to an embodiment of the present invention.

FIG. 6 is a diagram illustrating a calculation of a location measurement in a location measurement method according to an embodiment of the present invention.

Referring to FIG. 6, reference numbers 610, 620, 630, and 640 denote previous locations (t−4$\Delta s$, t−3$\Delta s$, t−2$\Delta s$, and t−$\Delta s$) compensated by location change measurement period ($\Delta s$), and reference number 650 denotes the location measured at time t, i.e., the currently measured location of the mobile node. The reference number 660 denotes displacements of the locations 610, 620, 630, and 640 in comparison with the locations before the location change measurement period ($\Delta s$), and reference number 670 denotes a displacement when the mobile node's movement pattern is changed abruptly. It is shown that the azimuth caused by the change of progressing direction of the mode is large.

Figure 7:
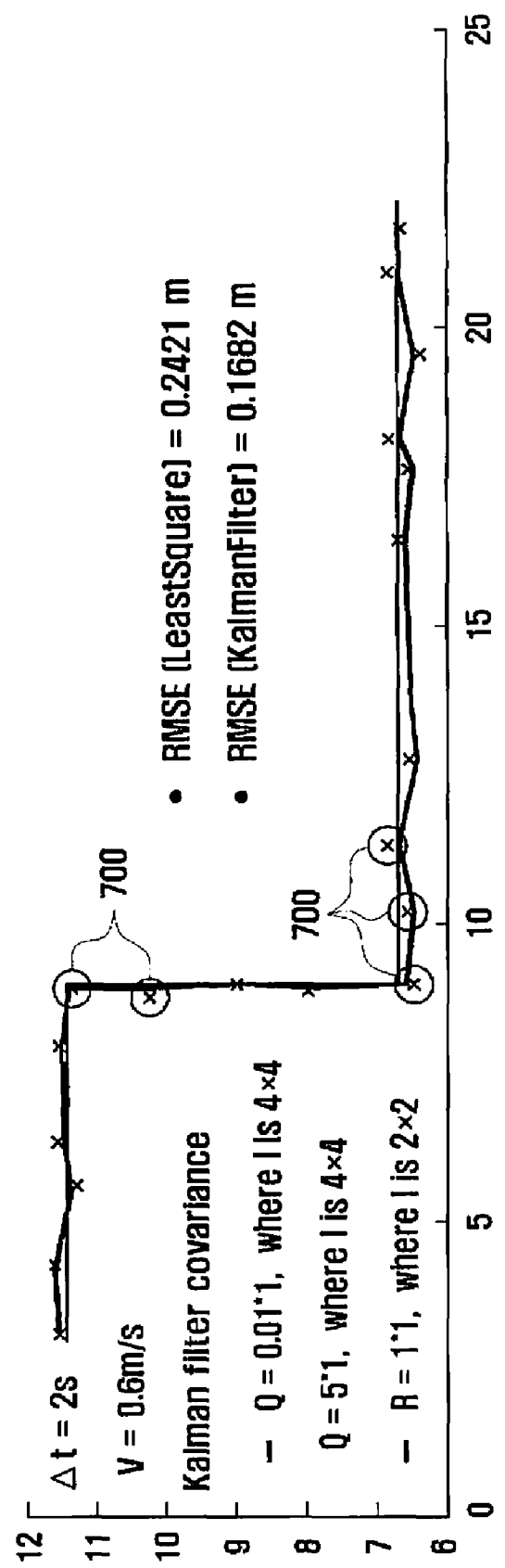
FIG. 7 is a graph illustrating a simulation result of the location measurement method according to an embodiment of the present invention.

The results of simulation performed for such example situation is shown in FIG. 7.

FIG. 7 is a graph illustrating a simulation result of the location measurement method according to an embodiment of the present invention. Particularly, FIG. 7 shows the location measurement simulation result using the least square estimation the Kalman filter which increases the weight of the value measured at a location at which the change of mobile node's movement is large (670 at FIG. 6).

As shown in FIG. 7, in comparison with the simulation result of the conventional method in FIG. 1, the route tracked by using the location measurement method according to the embodiment of the present invention is nearly identical with the actual route of the mobile node, resulting in improvement of location measurement accuracy.

The measurement values at locations 700 have been calculated by adopting the corrected covariance matrix which acts as the weight of the Kalman filter, and this has resulted in 70% reduction of RMSE (KalmanFilter) in comparison with that of the conventional method of FIG. 1.

The simulation has been performed using Matlap. The Matlap is engineering software providing numerical analysis and programming environments and allows easy matrix manipulation, plotting functions and data, implementation algorithms, creation of user interfaces, and interfacing with programs in other languages.

Although embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the location measurement method using a predictive filter according to the present invention adjusts the weight used in the predictive filter and location measurement period ($\Delta t$) adaptive to the mobile node's movement change, thereby improving the accuracy of location measurement.

Also, the location measurement method of the present invention improves the error compensation performance of the predictive filter by about 70% in comparison with the conventional error compensation method. Furthermore, the location measurement method of the present invention improves the error compensation performance of the mobile node without compromising system implementation complexity, because the location measurement method may be implemented without any additional devices.

What is claimed is:

1. A location measurement method of a mobile node, comprising:
    detecting a change of a movement pattern of the mobile node;
    correcting weights of a location measurement period and a predictive filter according to the change of movement pattern; and
    calculating a current location of the mobile node using values updated by the corrected weights,
    wherein correcting the weights of the location measurement period and the predictive filter comprises:
    calculating displacements of a movement direction and a distance of the mobile node at every location measurement period;
    comparing the calculated displacements with predetermined threshold values; and
    adjusting, when the displacements are greater than respective threshold values of the predetermined threshold values, the weights to be applied to estimation values of the predictive filter.

2. The location measurement method of claim 1, wherein detecting the change of the movement pattern of the mobile node comprises converting displacement information during a location change measurement period to cylindrical coordinates,
    and wherein the location change measurement period is variable.

3. The location measurement method of claim 1, wherein the weights comprise at least one parameter that is applied to the location measurement period and the predictive filter for calculating the location measurement error caused by the change of movement pattern of the mobile node.

4. The location measurement method of claim 3, wherein the location measurement period is inversely proportional to a movement speed of the mobile node.

5. The location measurement method of claim 1, wherein correcting the weights of the location measurement period and the predictive filter comprises calculating, when the displacements are less than or equal to the respective threshold values, the location measurement error by applying the adjusted weights.

6. A location measurement method of a mobile node, comprising:
    estimating, when detecting a change of a movement pattern of the mobile node, a location of the mobile node using a least square method;
    comparing a distance and an azimuth of the movement pattern with respective threshold values;
    correcting, when the distance of the movement pattern is greater than the threshold values, a weight of a location measurement period;
    correcting, when the azimuth of the movement pattern is greater than the threshold values, a weight of a predictive filter; and
    calculating a location measurement of the mobile node by applying the corrected weights.

7. The location measurement method of claim 6, wherein estimating the location comprises converting displacement information to cylindrical coordinates according to a location change measurement period in order to detect the change of movement pattern of the mobile node,
    and wherein the location change measurement period being variable.

8. The location measurement method of claim 6, wherein converting the displacement information to the cylindrical coordinates comprises:
    calculating a displacement between the estimated location and previous location before the location change measurement period;
    converting the displacement to the cylindrical coordinates; and
    acquiring the distance and the azimuth of the movement pattern from the cylindrical coordinates.

9. The location measurement method of claim 8, wherein the distance and the azimuth are obtained by calculating a displacement between location recognition coordinates ($\tilde{x},\tilde{y}$) measured at a time (t) and the coordinates measured and compensated before a location change measurement period ($\Delta s$) and converting the displacement to cylindrical coordinates using:

$$\sigma_t = \sqrt{(\overline{x}_t - x_{t-\Delta s})^2 - (\overline{y}_t - y_{t-\Delta s})^2}$$

and $$\phi_t = \arctan\left\{\frac{(\overline{y}_t - y_{t-\Delta s})}{(\overline{x}_t - x_{t-\Delta s})}\right\},$$

where $\sigma_t$ is the distance of the mobile node's movement, and $\phi_t$ is the azimuth (angle) of the mobile node's movement.

10. The location measurement method of claim 9, wherein location recognition coordinates $(\tilde{x}, \tilde{y})$ are coordinates of the mobile node that are measured currently, and the location change measurement period ($\Delta s$) is a unit duration for measuring change of mobile node's movement.

11. The location measurement method of claim 6, wherein calculating the location measurement comprises:
calculating, when at least one of the distance and azimuth of the movement pattern is less than or equal to the respective threshold values, the at least one of the distance and the azimuth using the predictive filter; and
correcting, when at least one of the distance and the azimuth of the movement pattern is greater than the respective threshold values, the weight of the at least one of the distance and azimuth.

12. The location measurement method of claim 6, wherein the threshold values correspond to measurement error ranges of the mobile node.

13. The location measurement method of claim 6, wherein the predictive filter is a Kalman filter.

* * * * *